US005410099A

United States Patent [19]

Kosugi

[11] Patent Number: 5,410,099

[45] Date of Patent: Apr. 25, 1995

[54] CHANNEL ASSIGNING SYSTEM FOR USE IN AN ELECTRONIC MUSICAL INSTRUMENT

[75] Inventor: Taichi Kosugi, Hamamatsu, Japan

[73] Assignee: Kawai Musical Inst. Mfg. Co., Ltd., Shizuoka, Japan

[21] Appl. No.: 150,269

[22] Filed: Nov. 10, 1993

Related U.S. Application Data

[63] Continuation of Ser. No. 739,462, Aug. 2, 1991, abandoned.

[30] Foreign Application Priority Data

Aug. 6, 1990 [JP] Japan .................................. 2-208917

[51] Int. Cl.[6] .................................. G01H 1/18

[52] U.S. Cl. .................................. 84/618; 84/656

[58] Field of Search .................. 84/615, 617, 618, 653, 84/655, 656

[56] References Cited

U.S. PATENT DOCUMENTS 4,223,584 9/1980 Nakada et al. .

4,481,851 11/1984 Swain et al. .................... 84/DIG. 2

4,515,058 5/1985 Deutsch .

4,788,896 12/1988 Uchiyama et al. .......... 340/340 S X 4,862,784 9/1989 Kimpara .............................. 84/622

4,882,964 11/1989 Okamoto et al. ................. 84/618 X 4,922,796 5/1990 Kondo et al. ......................... 84/618

4,957,031 9/1990 Kondo et al. ......................... 84/613

4,957,552 9/1990 Iwase ................................ 84/615 X 4,969,385 11/1990 Williams et al. ...................... 84/656

5,025,701 6/1991 Matsumoto .......................... 84/615

5,042,355 8/1991 Kozuki ................................ 84/618

5,095,800 3/1992 Matsuda .............................. 84/618

*Primary Examiner*—William M. Shoop, Jr.

*Assistant Examiner*—Brian Sircus

[57] ABSTRACT

A channel assigning system which effects an assignment of a channel other than a predetermined number channels which are preferentially assigned to any part of a piece of music, to a part thereof. To thus ensure an efficient use of the channels. Further, the predetermined number of channels to be assigned to any part of the piece of music can be ensured by assigning channels, other than the channels to be secured to newly performed musical tones.

22 Claims, 8 Drawing Sheets

FIG. 3

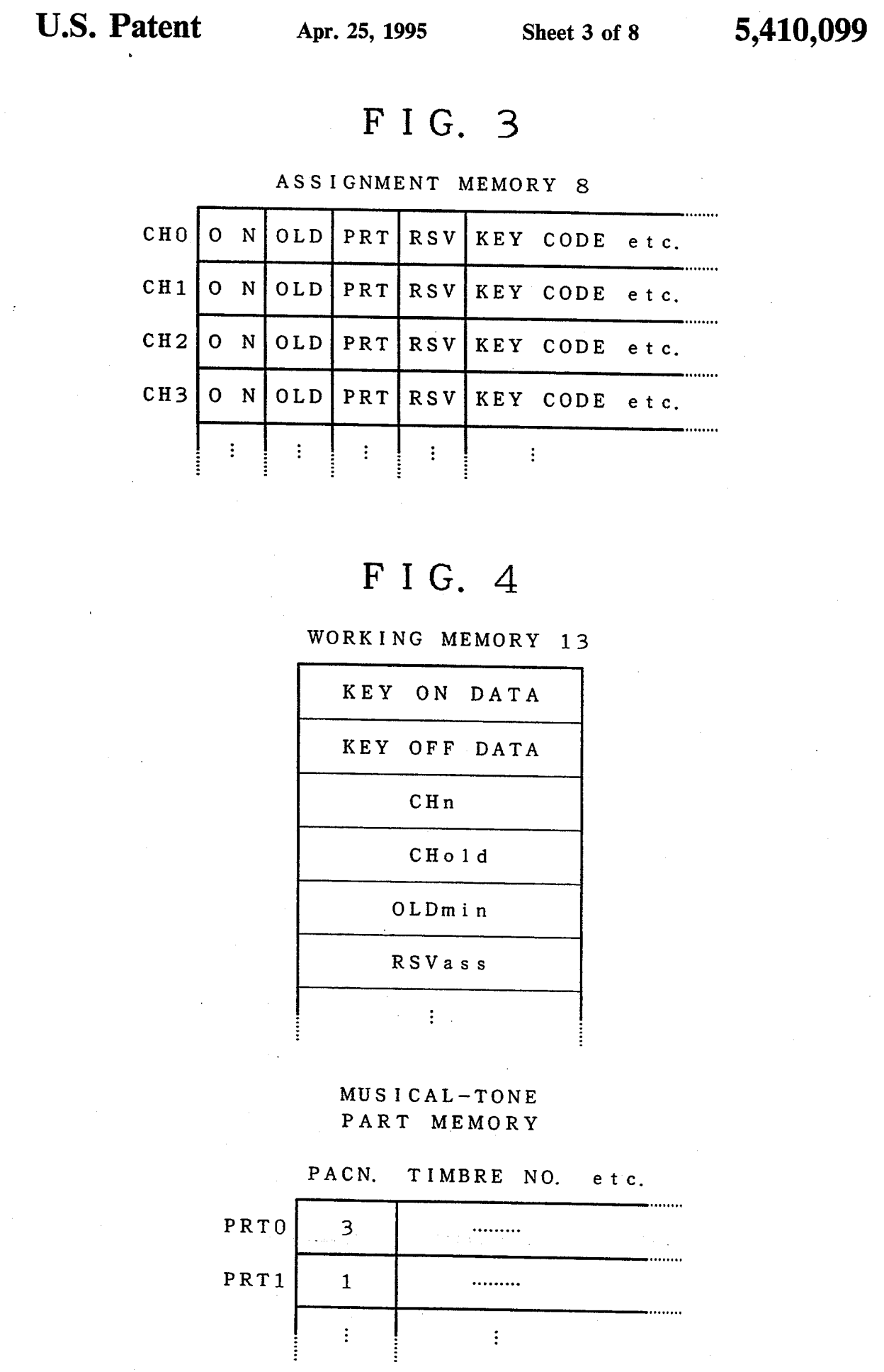

ASSIGNMENT MEMORY 8

| | | | | | |
|---|---|---|---|---|---|
| CH0 | O N | OLD | PRT | RSV | KEY CODE etc. ........ |
| CH1 | O N | OLD | PRT | RSV | KEY CODE etc. ........ |
| CH2 | O N | OLD | PRT | RSV | KEY CODE etc. ........ |
| CH3 | O N | OLD | PRT | RSV | KEY CODE etc. ........ |
| | ⋮ | ⋮ | ⋮ | ⋮ | ⋮ |

FIG. 4

WORKING MEMORY 13

| |
|---|
| KEY ON DATA |
| KEY OFF DATA |
| CHn |
| CHold |
| OLDmin |
| RSVass |
| ⋮ |

MUSICAL-TONE PART MEMORY

| | PACN. | TIMBRE NO. etc. |
|---|---|---|
| PRT0 | 3 | ......... |
| PRT1 | 1 | ......... |
| | ⋮ | ⋮ |

step 03,05,07 step 05
step 13 : (CHn)RSV="0"?
step 20: Yes to step 07
No to step 06 step 07
step 13 : (CHn)PRT=KEY ON PRT ?
step 20: Yes to step 09
No to step 08 step 04, 06, 08 step 10

FIG. 8A (1) KEY ON EVENT IN PART 0

| CHANNEL | ON | OLD | PRT | RSV |
|---|---|---|---|---|
| 0 | 1 | 1 | 0 | 1 |
| 1 | 1 | 2 | 0 | 2 |
| 2 | 1 | 3 | 0 | 3 |
| 3 | 0 | 0 | — | — |

→

| ON | OLD | PRT | RSV |
|---|---|---|---|
| 1 | 0 | 0 | 0 |
| 1 | 1 | 0 | 1 |
| 1 | 2 | 0 | 2 |
| 1 | 3 | 0 | 3 |

assign → (row 4)

—: Don't Care (2) KEY ON EVENT IN PART 0

| CHANNEL | ON | OLD | PRT | RSV |
|---|---|---|---|---|
| 0 | 1 | 3 | 0 | 3 |
| 1 | 1 | 0 | 0 | 2 |
| 2 | 1 | 1 | 1 | 0 |
| 3 | 1 | 2 | 1 | 1 |

→

| ON | OLD | PRT | RSV |
|---|---|---|---|
| 1 | 2 | 0 | 2 |
| 1 | 0 | 0 | 1 |
| 1 | 3 | 0 | 3 |
| 1 | 1 | 1 | 1 |

assign → (row 3)

OVERWRITE TO CH. 2

FIG. 8B (3) KEY ON EVENT IN PART 0

| CHANNEL | O N | OLD | PRT | RSV |
|---|---|---|---|---|
| 0 | 1 | 0 | 0 | 1 |
| 1 | 1 | 1 | 0 | 2 |
| 2 | 1 | 3 | 1 | 1 |
| 3 | 1 | 2 | 0 | 3 |

→

| | O N | OLD | PRT | RSV |
|---|---|---|---|---|
| assign → | 1 | 3 | 0 | 3 |
| | 1 | 0 | 0 | 1 |
| | 1 | 2 | 1 | 1 |
| | 1 | 1 | 0 | 2 |

OVERWRITE TO CH. 0

KEY ON EVENT IN PART 1

| CHANNEL | O N | OLD | PRT | RSV |
|---|---|---|---|---|
| 0 | 1 | 3 | 0 | 3 |
| 1 | 1 | 0 | 0 | 1 |
| 2 | 1 | 2 | 1 | 1 |
| 3 | 1 | 1 | 0 | 2 |

→

| | O N | OLD | PRT | RSV |
|---|---|---|---|---|
| | 1 | 2 | 0 | 3 |
| | 1 | 0 | 0 | 1 |
| assign → | 1 | 3 | 1 | 1 |
| | 1 | 1 | 0 | 2 |

OVERWRITE TO CH. 2

(4) KEY OFF EVENT OF KEY ASSIGNED TO CH. 2

| CHANNEL | O N | OLD | PRT | RSV |
|---|---|---|---|---|
| 0 | 1 | 0 | 0 | 0 |
| 1 | 1 | 1 | 0 | 1 |
| 2 | 1 | 2 | 0 | 2 |
| 3 | 1 | 3 | 0 | 3 |

→

| | O N | OLD | PRT | RSV |
|---|---|---|---|---|
| | 1 | 0 | 0 | 1 |
| | 1 | 1 | 0 | 2 |
| → | 0 | 2 | — | — |
| | 1 | 3 | 0 | 3 |

CHANNEL ASSIGNING SYSTEM FOR USE IN AN ELECTRONIC MUSICAL INSTRUMENT

This application is a continuation, of application Ser. No. 07/739,462 filed on Aug. 2, 1991, now abandoned.

BACKGROUND OF THE INVENTION

1. Field of the Invention

This invention relates to a channel assigning system for use in an electronic musical instrument, and more particularly, to an improved system for assigning channels to musical tones of individual musical-tone parts (hereunder referred to simply as parts) of a piece of music to be performed.

2. Description of the Related Art

Recently, electronic musical instruments adapted to simultaneously output musical tones of different parts (e.g., musical tones having different timbres) where a plurality of musical tones are simultaneously sounded have been proposed. One example of such a conventional electronic musical instrument is the type which outputs musical tones having a plurality of timbres, at the same time, and another example of these conventional electronic musical instruments i.e the type which inputs information about musical tones having different timbres from other electronic musical instruments, similar the operation of a Musical Instrument Digital Interface (MIDI) system.

Where a channel is assigned to musical tones of each of the parts in this type of conventional electronic musical instrument, the number of channels to be assigned to each of the parts is fixed. This prevents the number of sounded musical tones of one part, in which few "key on" and "key off" events occur, from utilizing fewer channels. than a sounded musical tones of another part in which a relatively large number of "key on" and "key off" events occur. Note, a "key on" event is an occurrence of the operation of turning on (or depressing), for example, a key corresponding to a musical tone of a part of a piece of music to be played. Conversely, a "key off" event is an occurrence of the operation of turning off (or releasing) a key corresponding to a musical tone of the part of the piece of music.

Nevertheless, as a result of fixing the number of channels to be assigned to each part, when a channel is assigned to a part, and the performance of that part is interrupted, the assigned channel is not used at all (i.e., is wasted), in this conventional electronic musical instrument, during the interruption of the performance of the part.

Conversely, in the case of another conventional electronic musical instrument, a channel is assigned regardless of which part the "key on" event for a musical tone occurred. Although this eliminates the unused (i.e., wasted) channels, this conventional electronic musical instrument cannot prevent the number of sounded musical tones of a part in which few "key on" and "key off" events occur from becoming much less than that of sounded musical tones of another part in which a relatively large number of "key on" and "key off" events occur.

The present invention has been created in order to solve the above described problems of the conventional electronic musical instruments.

Therefore, an object of the present invention is to provide a channel assigning system for use in an electronic musical instrument, by which a predetermined number of simultaneously sounded musical tones of each part can be secured and musical tones in a number greater than the predetermined number can be sounded, to thereby ensure an efficient use of the channels.

SUMMARY OF THE INVENTION

To achieve the foregoing object, in accordance with the present invention there is provided, a channel assigning system for use in an electronic musical instrument, which comprises directing means for directing that a musical tone should be sounded a number, of musical-tone generating channels which is less than that of the directing means and equal to a maximum number of actually sounded musical tones which can be sounded simultaneously, a discerning means for discerning whether or not an idle channel among the musical-tone generating channels is assigned to a musical tone which is not being sounded, a channel-assigning means for newly assigning a channel to a musical tone of a part when the predetermined number of musical-tone generating channels corresponding to the part are assigned to musical tones of the part, when the result of the discernment indicates that an idle channel exists, and an assignment control means for newly assigning one of the musical-tone generating channels, each of which is assigned to a musical tone of a part in addition to the predetermined number of musical-tone generating channels corresponding to the part, to a musical tone of a part prior to the other musical-tone generating channels when the predetermined number of musical-tone generating channels corresponding to the part are assigned to musical tones of the part when the result of the discernment indicates that no idle musical-tone generating channels exist.

Thus, in the channel assigning system of the present invention, channels other than the predetermined number of channels of corresponding to a part, and assigned to the part prior to the other parts, can be assigned-to musical tones of the part. Therefore, when a channel, has been assigned to a part, and the performance of the pant is interrupted, the channel can be reassigned to and used for (i.e., diverted to the production of a sound of a musical tone of) another part, and thus the musical-tone channels are efficiently used. Further, a channel which has been assigned to a musical tone of a pant when a predetermined number of the channels to be preferentially assigned to the part have been assigned thereto, can be reassigned to another musical tone, and thus a channel to be assigned to a new musical tone is selected only from diverted musical-tone generating channels and not from the predetermined number of musical-tone generating channels preferentially assigned to the parts, and the selected channel is then assigned to a new musical tone. Accordingly, the predetermined number of channels which corresponding to each part of a piece of music can be preferentially assigned to each part thereof.

BRIEF DESCRIPTION OF THE DRAWINGS

Other features, objects and advantages of the present invention will become apparent from the following description of a preferred embodiment, with reference to the drawings in which like reference characters designate like or corresponding parts throughout several views, and in which:

FIG. 3 is a diagram illustrating the contents of an assignment memory 8 of FIG. 2;

FIG. 4 is a diagram illustrating the contents of a working memory 13 in a random access memory (RAM) 11 of FIG. 2;

FIGS. 8A and 8B are diagrams illustrating practical examples of the assignment of channels.

DESCRIPTION OF THE PREFERRED EMBODIMENT

Hereinafter, a preferred embodiment of the present invention will be described in detail, with reference to the accompanying drawings.

Figure 1:
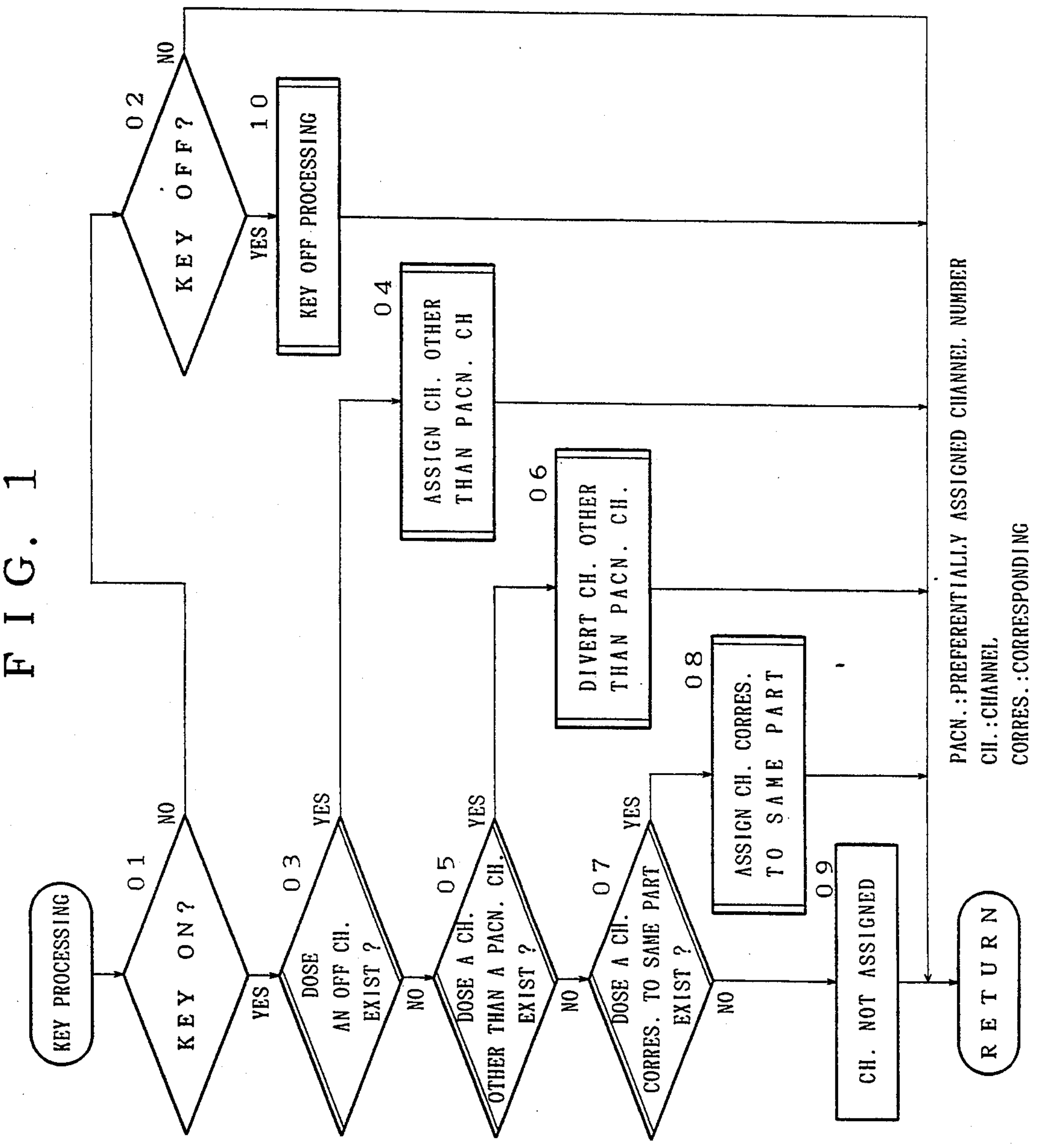
FIG. 1 is a flowchart of a program executed when performing a "key process"

As shown in FIG. 1, if a channel which is turned off (hereunder referred to as a "key off" channel) is found in steps 03 and 04 (corresponding to steps 13 and 16 of FIG. 5), the channel is assigned to a musical tone (in steps E1 to G4 of FIG. 6) even when all of a predetermined number of channels PACN to be preferentially assigned to each part of a piece of music to be performed are already assigned, and thus the channels are effectively used.

Conversely, if no "key off" channel is found (in steps 13 and 16 of FIG. 5), a channel other than the number of channels PACN assigned to each part, which channel is being assigned to a musical tone of a part, is newly assigned to (i.e., diverted to the production of a sound of) another musical tone (in steps 21 to 24 of FIG. 6), and therefore, channels other than the number of channels PACN assigned to each part are diverted to the production of a sound of a new musical tone, and the number of channels PACN assigned to each part is always ensured.

Figure 5:
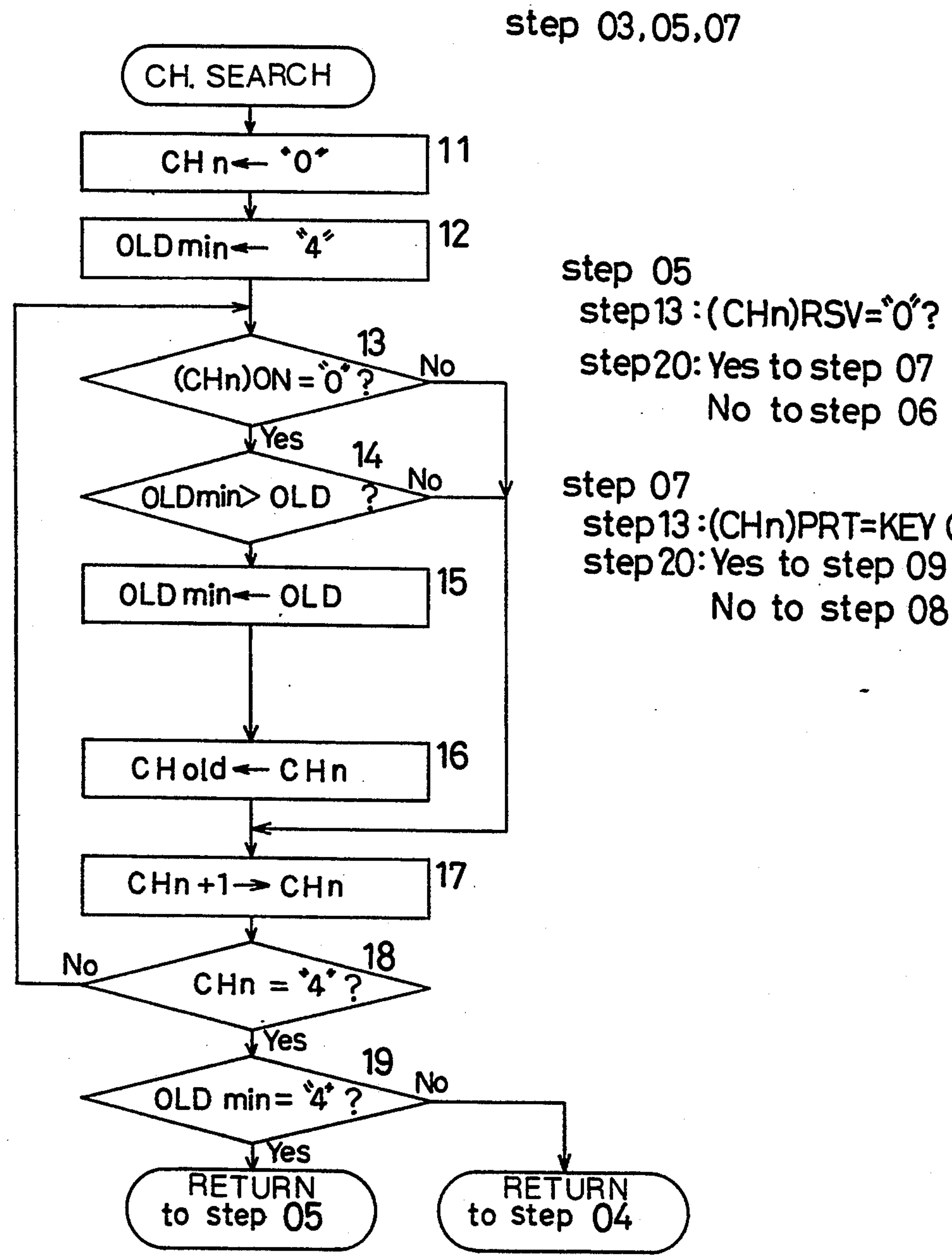
FIG. 5 is a flowchart of a program executed when performing an "assigned channel search process" in steps 03, 05 and 07 of FIG. 1.
Figure 6:
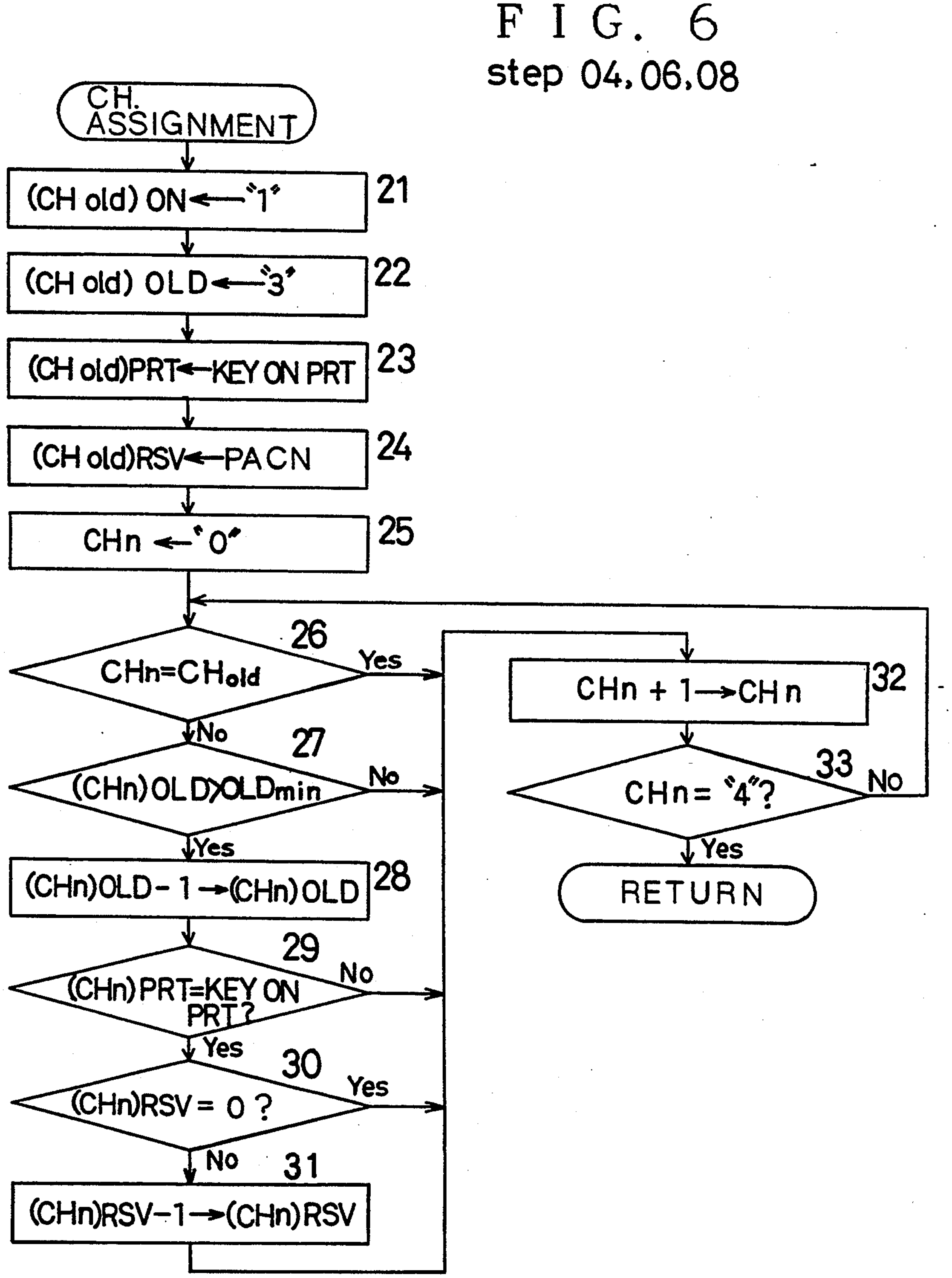
FIG. 6 is a flowchart of a program executed when performing a "channel assigning process", in steps 04, 06 and 08 of FIG. 1.

Moreover, if no channel exists other than the number of channels PACN assigned to each part, the system searches for a "key on" channel (i.e., a channel which is turned on) that can be reassigned (i.e., diverted to the production of a sound of) to a musical tone of a part, among the number of channels PACN assigned to another musical tone of the part, and assigns the channel when found to the former musical tone of the part in steps 07 and 08 of FIG. 1 (see steps 13 and 16 of FIG. 5 and steps 21 to 24 of FIG. 6). Therefore, if all of the number of channels PACN assigned to a part are turned on (i.e., in a "key on" state), those channels cannot be diverted to the production of a sound of musical tones of another part.

The number of channels PACN preferentially assigned to each part is predetermined in accordance with priority reserving data RSV. As illustrated in FIG. 8, when a channel is assigned to a musical tone of a part, the priority reserving data RSV indicating an initial value thereof equal to the number PACN corresponding to the part, is written in step 24 of FIG. 6 to an assignment memory 8 described later. Thereafter, in steps 29 and 31 of FIG. 6, the number indicated by the data RSV is decremented by 1 each time a channel is assigned to a musical tone of the part. When the number of channels PACN are assigned to musical tones of the part, the number indicated by the data RSV becomes equal to 0. Therefore, when the data RSV is 0, a channel other than the number of channels PACN assigned to the part must be assigned to another musical tone of the part. Therefore, when the data RSV is 0, such a channel is searched for in step 05 of FIG. 1 (corresponding to steps 13 and 16 of FIG. 5). Note, a channel at which the "key on" operation is first effected is then searched for among the channels searched when the data RSV was 0, in steps 14 and 15 of FIG. 5.

Figure 2:
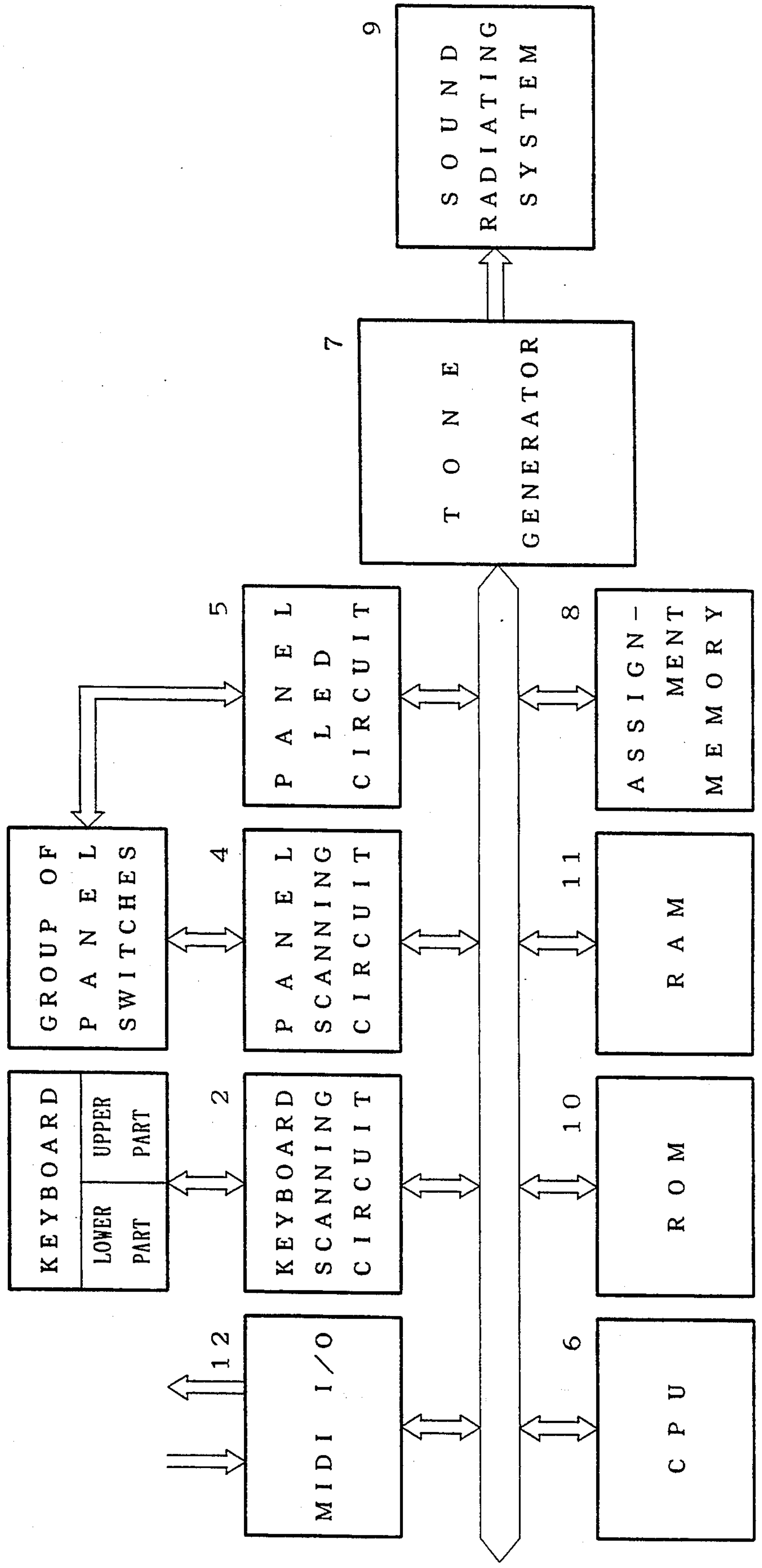
FIG. 2 is a schematic block diagram illustrating an entire electronic musical instrument provided with a channel assigning system embodying the present invention.

1. The Construction of the Entire Circuit of an Electronic Musical Instrument FIG. 2 shows the construction of the entire circuit of an electronic musical instrument, wherein a keyboard 1 is partitioned into a lower part 1*a* and an upper part 1*b*. The lower part 1*a* of the keyboard 1 can be used to perform musical tones having a timbre different from that of musical tones performed by using the upper part 1*b* thereof, and thus data used to perform a part of a piece of music and data used to perform another part thereof are input from the lower and upper parts 1*a* and 1*b*, respectively. Each key of the keyboard 1 is scanned by a key scanning circuit 2, whereby turned-on keys (hereunder referred to as "key on" keys) and turned-off keys (hereunder referred to as "key off" keys) are detected, and then data representing the results of this detection is written by a central processing unit (CPU) 6 to the assignment memory 8. Data representing musical tones (hereunder referred to as musical-tone data) sent from external equipment connected to the electronic musical instrument through an MIDI interface 12 can be written to this assignment memory 8 by the CPU (i.e., an assigner) 6, and further, musical-tone data to be written to the assignment memory 8 may be generated on the basis of automatic performance data stored in a read-only memory (ROM) 10 or a random access memory (RAM) 11. This write operation is effected by the CPU 6 by a process described later with reference to FIGS. 1 and 5 to 7.

Although the assignment memory 8 is illustrated as separate from the RAM 11 in FIG. 2, in practice the composing elements 8 and 11 may be constructed in a memory, or the assignment memory 8 may be provided in a tone generator 7. Each switch of a group 3 of panel switches is used to select the timbre of musical tones corresponding to the lower part 1*a* or the upper part 1*b* of the keyboard 1, and a rhythm and so on. Further, each switch of the group 3 is scanned by the panel scanning circuit 4, and data representing the result of the scan (i.e., the selected timbre, rhythm, and so forth) is sent by the CPU 6 to the tone generator 7. Furthermore, the result of the scan is input to a panel light emitting diode (LED) circuit 5, and LEDs thereof corresponding to the turned-on switches of the group 3 are turned on. Note, an electric string instrument (e.g., an electronic guitar), an electric wind instrument, an electronic percussion instrument or a keyboard of a computer system may be substituted for the keyboard 1. Namely, any device capable of directing another part of the embodiment to produce the sounds of musical tones may be substituted for the keyboard 1.

A musical tone signal is generated in the tone generator 7 in accordance with various data sent thereto and with data set in the assignment memory 8, and the generated musical tone signal is sent to a sound radiating system 9 which produces the sounds of musical tones represented by the musical tone signal sent thereto. Programs to be executed by the CPU 6 for performing various processes, and data representing fixed values, are stored in the ROM 10 (musical tone waveform data and envelope waveform data are also stored in some cases), modification data such as various process data representing a variable value is stored in the RAM 11. Further, a musical tone generating system which generates musical tones of 4 channels by effecting a process in a time-sharing manner is formed in the tone generator 7, and correspondingly thereto, musical tone data representing musical tones to which the 4 channels are assigned is stored in the assignment memory 8. Note, any number of channels other than 4 may be employed.

2. The Assignment Memory 8

FIG. 3 shows a storage area (hereunder referred to as a channel area) of the assignment memory 8, where, for example, key codes, timbre data, frequency number data, envelope data and velocity data in addition to on/off data ON, order-of-depressing-key data OLD, part data PRT, and priority reserving data RSV are stored. Note, the number of channel areas of the assignment memory 8 may be more or less than 4.

The on/off data ON is 1-bit data representing the state of each key of the keyboard 1. Namely, if a key thereof is depressed, the on/off data ON corresponding to the key is 1, and conversely, if the key is released, the on/off data ON corresponding to the key is 0.

The order-of-depressing-key data OLD represents the order in which an "key on" operation of each key of the keyboard 1 is effected. When new musical tone data is written to the assignment memory 8, the data OLD indicating 3 is also written thereto, and thereafter, the order indicated by the data OLD is decremented by 1 each time a "key on" operation of a key is effected. When a "key off" operation of the key is effected, the data OLD corresponding to the key is not cleared, and thus the data OLD at 0, 1, 2 and 3 are respectively assigned to the keys in the order in which the "key on" operations thereof are effected.

The part data PRT indicates whether the part 1 of a piece of music corresponds to the lower part 1*a* of the keyboard 1 or whether the part 0 of the piece of music corresponds to the upper part 1*b* of a musical tone, for which the "key on" operation is effected. The part of a piece of music is determined in accordance with the high-order bits of the key code. The number of channels to PACN be preferentially assigned to the part 1 prior to the other part 0 is 1, and thus the number of channels PACN to be preferentially assigned to the part 0 is 3. Obviously, the total number of channels PACN cannot exceed the total number of channels (i.e., 4 in this embodiment), but the total number of channels PACN can be less than the total number of channels, and in such a case, more than one channel is not preferentially assigned to any part of a piece of music.

The priority reserving data RSN indicates a priority of a musical tone of a part for an assignment of a channel thereto, with regard to the other musical tones of the part. When musical tone data is newly written to the assignment memory 8, the priority indicated by the data RSV is equal to the number of channels PACN. Thereafter, the priority indicated by the data RSV is decremented by 1 each time a "key on" operation of another musical tone of the part is effected. For example, in the case of the part 0, the data RSV indicating a priority of 3 is written to the assignment memory 8 when new musical tone data is written thereto. Thereafter, every time a "key on" operation of a musical tone of the part is performed, the priority corresponding to the musical tone for which the "key on" operation is currently effected is decremented by 1 (i.e., the priority drops from 3 to 0), and when the priority reaches 0, the priority will not be further decremented. Therefore, the priority reserving data RSV indicating 0, 1, 2 and 3 are respectively assigned to the musical tones of the part in the order of "key on" operations thereof (i.e., from a musical tone at which the "key on" is first effected, to another musical tone at which the "key on" is fourth effected). In this case, if the number of musical tones of the part 0 to be simultaneously sounded is equal to or greater than 5, the priority reserving data RSV indicating 0. 0 ... 0, 1, 2 and 3 are respectively assigned to the musical tones to be simultaneously sounded. If the number of musical tones of the part 0 to be simultaneously sounded is equal to 3, the priority reserving data RSV indicating 1, 2 and 3 are respectively assigned to the musical tones to be simultaneously sounded. Further, if the number of musical tones of the part 0 to be simultaneously sounded is equal to 2, the priority reserving data RSV indicating 2 and 3 are respectively assigned to the musical tones to be simultaneously sounded. Furthermore, if only one of the musical tones of the part 0 is sounded, the priority reserving data RSV indicating 3 is assigned to the musical tone to be sounded.

Thus, the channels corresponding to the priority of 0 indicated by the data RSV are channels other than the number of channels PACN. Further, the channels corresponding to the priority of 0 are assigned to new musical tones prior to the other channels. Where no "key off" channel exists but a plurality of channels corresponding to the priority of 0 indicated by the data RSV exists, a channel corresponding to a musical tone for which the "key on" operation is first effected (i.e., the corresponding data OLD is the smallest) is selected from the plurality of channels corresponding to the priority of 0, and is first assigned to a musical tone. Further, where no "key off" channel exists and no channel corresponding to the priority of 0 indicated by the data RSV exists, channels corresponding to the data RSV which indicate 1, 2 or 3 cannot be reassigned (i.e., diverted to the production of a sound of) to a musical tone of another part, as long as the "key on" operations of musical tones corresponding to such channels are being effected. Note, when a "key on" operation of another musical tone of the same part is effected, a channel in which the corresponding data RSV has the smallest value is assigned to the musical tone.

When a "key off" operation is effected, the data RSV corresponding to the musical tone for which the "key off" operation is effected is cleared, and then each of the values indicated by the data RSV which correspond to the other musical tones, and indicate values smaller than the value indicated by the cleared data RSV, is incremented by 1. Therefore, if a value indicated by data RSV once becomes equal to 0, the value indicated by the data RSV may again become equal to or more than 1.

Note, data RSV may have a value other than that described above, i.e., 0, 1, 2 and 3, and further, more simplified data RSV may be employed. For example, the simplified data RSV may be determined such that the data RSV corresponding to any of the number of channels PACN assigned to a part has a value of 1, and the data RSV corresponding to other channels to be assigned to the part has a value of 0.

3. A Working Memory 13

FIG. 4 illustrates the contents of the working memory 13 in which a "key on" data register, a "key off" data register, and registers CHn, CHold, OLDmin, RSVass, in addition to a musical-tone part memory, are provided.

In the musical-tone part memory, the number of channels PACN (i.e., 3 and 1) corresponding respectively to the parts 0 and 1 are stored. These number of channels PACN are prestored in the ROM 10 and are output therefrom to the working memory 13 when power is turned on. Further, the number of channels PACN corresponding to the parts 0 and 1 may be set by being input from the group 3 of panel switches. Alternatively, the number of channels PACN may be fixed in a program stored in the ROM 10.

Note, timbre number data representing timbres of a piano, a violin, a drum and the like, selected by the group 3 of the panel switches, are written to each of the storage areas 0, 1, . . . , and a timbre actually employed for performing each part is determined according to this timbre number data.

A key code, part data PRT, and velocity data and the like corresponding to a key for which the "key on" operation is effected are stored in the "key on" data register. Similarly, a key code, part data PRT, and velocity data and the like corresponding to a key for which the "key off" operation is effected are stored in the "key off" data register. Each of these registers can store such data of a plurality of keys.

The register CHn is used for counting the number of times a search is made of channel areas provided in the assignment memory 8.

Channel numbers of channels to be assigned are searched for in the register CHold.

A minimum one of the values indicated by data OLD corresponding to each of searched channels is stored in the register OLDmin.

Data RSV corresponding to each of searched channels to be assigned is stored in the register RSVass.

4. Key Process

FIG. 1 is a flowchart of a program executed when performing a key process. This key process comprises an entire process to be performed by the system, together with an initializing process and a panel switch process. This entire process is started when power is turned on.

In the key processing, in steps 01 and 02 the CPU 6 first determines, from outputs of the key scanning circuit 2, whether a "key on" event and a "key off" event have occurred. If a "key on" event has occurred, a channel assigning process described hereinbelow is effected in steps 03 to 09, and if a "key off" event has occurred, a "key off" process described later is performed in step 10.

In the channel assigning process where a "key on" event has occurred, in step 03 the assignment memory 8 is searched for a channel area in which the on/off data is 0 (hereunder referred to as a "key off" channel area). If "key off" channels exists, in step 04 the musical tone for which the "key on" operation is effected is assigned to a channel in which the corresponding data OLD has the smallest value among values indicated by the data OLD of the "key off" channel areas.

The thus-assigned channel is not a channel of the number of channels PACN, and therefore, the channels are efficiently used.

In step 03, if it is found that no "key off" channel area exists, channel areas for which the data RSV is 0 (i.e., channel areas corresponding to channels assigned to a part which are not channels of the number of channels PACN preferentially assigned to the part) are searched for in step 05. If a group of such channels is found, a musical tone corresponding to the "key on" event is assigned in step 06 to a channel in which the data OLD has a value smaller than any other values indicated by the data OLD corresponding to the other channels of the group.

The thus searched and assigned channel is a channel diverted from the channels which are assigned to a part and are not channels of the number of channels PACN to be preferentially assigned to the part, and the number of channels PACN to be assigned to each part is always secured.

If it is found in step 05 that there is no channel area in which the data RSV indicates 0, channels assigned to the part which includes the musical tone corresponding to the "key on" event are searched for in step 07. If a group of such channels exists, the musical tone corresponding to the "key on" event is assigned in step 08 to a channel in which the corresponding data OLD has a value smaller than values indicated by the data OLD corresponding to other channels of the group.

If there is no "key off" channel, and moreover, there is no channel other than the number of channels PACN assigned to the part, one of the channels of the number of channels PACN assigned to the part is diverted to the musical tone for which the "key on" event has occurred of the part. Therefore, the channels of the number of channels PACN assigned to a part cannot be reassigned to (i.e., diverted to the production of a sound of) another part.

If it is found in step 07 that there is no channel area corresponding to a channel assigned to the part including the musical tone for which the corresponding "key on" event has occurred, no channel is assigned to the musical tone (see step 09).

If it is found in step 02 that a "key off" event has occurred, the CPU 6 effects a "key off" process of a channel corresponding to the "key off" event in step 10.

5. A "Key Off" Channel Searching Processing

FIG. 5 is a flowchart of a program executed when performing a "key off" channel search process in step 03 of FIG. 1.

In this process, the register CHn is cleared in step 11, and then the total number of channels (i.e., 4 in this embodiment) is set in the register OLDmin in step 12. Subsequently, it is determined in step 13 whether or not on/off data ON stored in a channel area of the assignment 8 corresponding to a value indicated by the register CHn indicates 0 (i.e., a channel corresponding to the channel area is in an off-state). If the channel is not in an off-state, the content of the register CHn is incremented by 1 in step 17. Further, in step 19, the search process performed in steps 13 and 17 is repeatedly effected. If an off-state channel area is found in step 13, it is determined in step 14 whether OF not data OLD corresponding to this channel area has a value smaller than the value indicated by the register OLDmin. If the data OLD has a value smaller than the value indicated by the register OLDmin, the data OLD is written to the register OLDmin in step 15, and further, the value indicated by the register CHn is written to the register CHold in step 16. The above described process is performed until the value indicated by the register CHn becomes equal to 4, i.e., until the processing of all of the channel areas is completed (see steps 17 and 18).

Namely, a group of "key off" channels are searched for, and the detected "key off" channels are then searched to find a channel corresponding to data OLD having a value smaller than data OLD corresponding to any other "key off" channels of the group. Namely, a search is made for a channel corresponding to a musical tone for which the "key on" operation is effected earlier than those of any other musical tones of all parts, and the channel number of the thus detected channel is stored in the register CHold.

Finally, it is determined in step 19 whether or not the value indicated by the register OLDmin is updated from 4 (i.e., whether of not a "key off" channel exists). If a "key off" channel exists, the program advances to step 04, but if a "key off" channel does not exist, the program goes to step 05.

6. A "Key Off" Channel Assigning Process

FIG. 6 is a flowchart of a program executed when performing the "key off" channel assigning process of step 04 of FIG. 1.

In this process, the value represented by the on/off data ON corresponding to the "key off" channel, searched for in step 03 of FIG. 1 (corresponding to step 17 of FIG. 5) and having the channel number indicated by the register CHold, is made 1 (corresponding to an on-state) in step 21. Then, in step 22 the value indicated by the data OLD corresponding to the "key off" channel is set to be 3 (=the end of a number indicating ((the number of all channels)−1)), and subsequently, in step 23 musical-tone part data PRT indicating the part including the musical tone for which the "key on" operation is effected is written to the assignment memory 8. Then, in step 24 the value indicated by the data RSV is set to be the maximum thereof equal to the number of channels PACN corresponding to the part.

Thus, channels other than the number of channels PACN corresponding to a part can be assigned to musical tones of the part, and thus the channels of the electronic musical instrument can be effectively utilized As described above, in steps 22 and 24 new values of the data OLD and RSV of the channel area corresponding to the searched "key off" channel are written to the assignment memory 8, and as the result, it is necessary to change the values of the data OLD and RSV stored in the channel areas corresponding to the other channels. Thus, the modification process of the data OLD and RSV is effected in steps 25 to 32, as follows.

First, the register CHn is cleared in step 25, and then in step 26 it is determined whether or not the value of the register CHn matches that of the register CHold. If a match is found, the process composed of steps 25 to 30 is not performed. This is because musical tone data of a musical tone for which the "key on" operation has been newly effected has just been assigned in steps 21 to 24 to the channel corresponding to the value indicated by the register CHold. Subsequently, it is determined in step 27 whether or not the data OLD stored in the channel area of the assignment memory 8 corresponding to the value indicated by the register CHn is greater than the old (i.e., previous) order-of-depressing-key data OLD stored in the register OLDrain in step 15 (i.e., the data OLD stored in the assigned channel). If not greater than the latter, the content of the register CHn is incremented by 1 in step 32, and then the search process to be performed in steps 27 and 32 is repeated in step 33.

If greater than the latter data OLD, in step 28 the value indicated by the data OLD is decremented by 1.

Thus, the modification of the data OLD is performed in response to the writing of the new order-of-depressing-key data OLD to the memory 8 by changing data OLD indicating an order greater than the previous (or older) order indicated by the data OLD corresponding to the assigned channel and less than 3 indicated by the new order-of-depressing-key data OLD.

Subsequently, if it is found in step 29 that the musical-tone part data PRT of this searched for channel area matches the data PRT corresponding to the musical tone for which the "key on" operation is effected, the value represented by the data RSV, the corresponding data RSV of which is found in step 30 not to be 0, is decremented by 1 in step 31.

Thus, the modification of the data RSV is effected in response to the writing of the new priority reserving data RSV to the memory 8, by changing the data RSV.

Further, the above described "key off" channel assigning process is performed until the value indicated by the register CHn becomes equal to 4, i.e., until this process is finished for all of the channels (see steps 32 and 33).

7. A Search Process of Channels other than the Number of Channels PACN to be Assigned This process is similar to the "key off" channel process of FIG. 5. Note, it is determined in step 13 whether or not the data RSV stored in the searched for channel area indicates 0, i.e., whether or not the searched channel assigned to a musical tone of a part is other than the number of channels PACN preferentially assigned to musical tones of the part.

As the result of this process, the CPU searches the channels in which the corresponding data REV is 0 to find a channel in which the corresponding data OLD has a value smaller than the data OLD corresponding to any other channel (i.e., for a channel corresponding to a musical tone for which the "key on" operations is effected earlier than the "key on" operations of musical tones of all parts corresponding to any other channel). Further, the data OLD corresponding to the thus searched for channel is stored in the register OLDmin, and the channel number of the thus searched for channel is stored in the register CHold.

Finally, it is determined in step 19 whether or not the value indicated by the register OLDrain is updated from 4, i.e., whether or not a channel exists that can be assigned to the musical tone. If the result is yes, the program advances to step 06 of FIG. 1, and if it is no, the program goes to step 07 of FIG. 1.

8. An Assigning Process of Channels other than the Number of Channels PACN to be Assigned This process to be performed in step 06 is the same as the "key off" channel assigning process of FIG. 6. In this process, as the result of the process effected in step 23, two cases exist wherein the previous (or old) musical-tone part data PRT corresponding to the assigned channel matches the new musical-tone part data PRT and wherein the former data PRT does not match the latter data PRT. If a match is found, channels assigned to a part and other than the number of channels PACN assigned to the part are diverted to the production of sounds of musical tones of the part. If a match is not found, channels assigned to a part and other than the number of channels PACN assigned to the part are diverted to the production of sounds of musical tones of another part.

As the result of this assignment process, channels assigned to a musical tone and other than the number of channels PACN preferentially assigned to each part are diverted to the production of a sound of another musical tone, and consequently, the number of channels PACN preferentially assigned to each part can be always ensured.

9. A Search Process of Channels Assigned to the Same Part

This process to be performed in step 07 of FIG. 1 is similar to the "key off" channel search process of FIG. 5. Note, it is determined in step 13 whether or not the data PRT of the searched for channel area matches the PRT of the channel to be assigned to the part including the musical tone for which the "key on" operation is effected, i.e., whether the part corresponding to the searched for channel matches that including the musical tone for which the "key on" operation is effected.

As the result of this process, a search is made among the channels assigned to the same part for a channel in which the corresponding data OLD is smaller than those corresponding to any other channel assigned to the same part, i.e., for a channel assigned to a musical tone for which the "key on" operation is effected earlier than those of musical tones corresponding to any other channel assigned to the same part. Further, the data OLD corresponding to the thus searched for channel is stored in the register OLDrain, and the channel number of the thus searched for channel is stored in the register CHold.

Finally, in step 9 it is determined whether or not the value indicated by the register OLDrain is updated from 4, i.e., whether or not an assignable channel exists. If the result is yes, the program advances to step 08, but if it is no, the program goes to step 09.

10. Reassigning Process of Channels Assigned to the Same Part

This process to be performed in step 08 is the same as the "key off" channel assigning process of FIG. 6.

As the result of this process, channels assigned to a part are diverted to the production of a sound of a musical tone of the same part, and thus the number of channels PACN assigned to the part cannot be reassigned to another part.

11. "Key Off" Process

Figure 7:
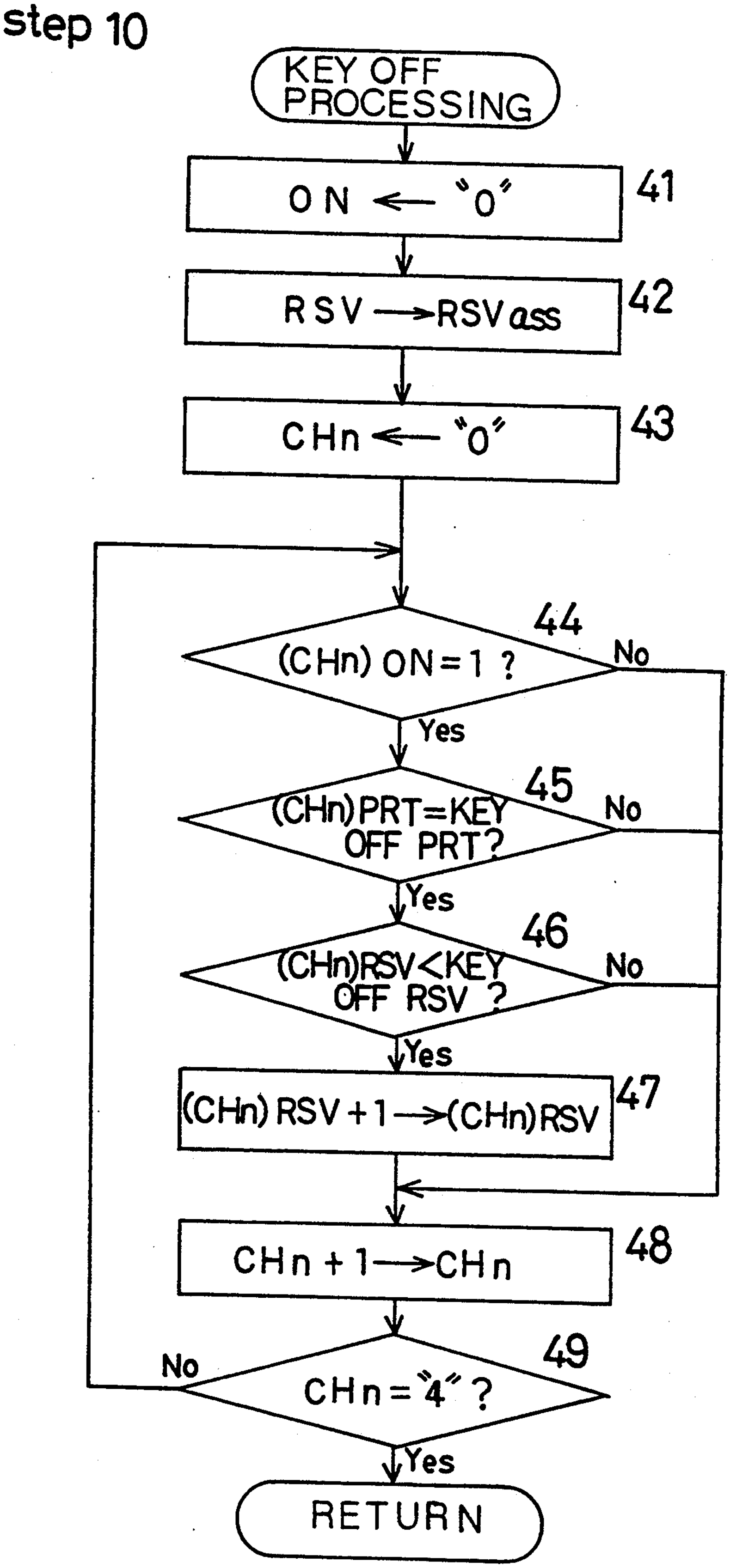
FIG. 7 is a flowchart of a program executed when performing a "key off" process in step 10 of FIG. 1.

FIG. 7 is a flowchart of a program executed for performing the "key off" process performed in step 10 of FIG. 1.

In this process, in step 41, a value indicated by on/off data ON stored in a channel area corresponding to a musical tone for which the "key off" operation is effected is made 0. Then, in step 42, data RSV corresponding to the "key off" channel is transferred to the register RSVass.

Here, the data RSV corresponding to the "key off" channel becomes invalid (i.e., meaningless), and thus the content of data RSV stored in the other channel areas must be modified. Therefore, the modification of the data RSV is effected in steps 43 to 49 as follows.

First, the register CHn is cleared in step 43, and then it is confirmed in step 44 that the on/off data ON stored in the channel area of the assignment memory 8 corresponding to the value indicated by the register CHn indicates 0 (corresponding to an on-state). Thereafter, it is determined in step 45 whether or not the data PRT stored in the channel area of the assignment memory 8 corresponding to the value indicated by the register CHn matches the data PRT corresponding to the "key off channel". If a match is not found, the content of the register CHn is incremented by 1 in step 48, and then the process comprised of steps 44, 45 and 48 is repeatedly effected in step 49.

Where the data PRT corresponding to the searched for channel matches the data PRT corresponding to the "key off" channel, if it is found in step 46 that a value indicated by data RSV corresponding to the searched for channel is smaller than a value indicated by data RSV corresponding to the "key off" channel, the value indicated by the data RSV is incremented by 1. Here, where a plurality of pieces of data RSV of which the values are 0 exist, only the value of the data RSV corresponding to a channel in which the corresponding data OLD is larger than the data .OLD of any other channel corresponding to the plurality Of pieces of data RSV is incremented by 1.

Thus, the data RSV indicating a value less than the value indicated by the data RSV corresponding to the "key off" channel is changed. The modification of values of data RSV is effected by making the data RSV corresponding to the "key off" channels invalid.

Further, the above described "key off" process is performed until the value indicated by the register CHn becomes equal to 4, i.e., until this process is completed for all of the channels (see steps 48 and 49).

12. Practical Examples of the Assignment of Channels

FIGS. 8(1) to 8(4) illustrates practical examples of the assignment of channels.

(1) A practical example of the process performed in steps 03 and 04 of FIG. 1 (corresponding to steps 11 to 19 of FIG. 5 and steps 21 to 33 of FIG. 6) is illustrated in FIG. 8(1).

Where musical tone data of a musical-tone part 0 is assigned to channels 0, 1, and 2 when a "key on" operation of a musical tone of the same part 0 is newly effected, on/off data ON having the value 1, the data PRT having the value 0, the data OLD in which the end is 3, and the data RSV for which the value is the maximum (i.e., 3) are written to a channel 3 which is a "key off" channel. Then, the modification of the data OLD and RSV is effected by decrementing a value indicated by each piece of the data OLD and RSV corresponding to-the other channels, by 1.

Thus, if a "key off" channel exists (i.e., a channel 3), the channel 3 (i.e., a 4th channel) other than the number of channels PACN (i.e., the three channels 0, 1 and 2) is assigned to the part 0, even though the number of channels PACN is 3.

(2) A practical example of the process performed in steps 05 and 06 of FIG. 1 (corresponding to steps 11 to 19 of FIG. 5 and steps 21 to 33 of FIG. 6) is illustrated in FIG. 8(2).

Where musical tones of the part 0 are assigned to the channels 0 and 1 and musical tones of the part 1 are assigned to the channels 2 and 3, a musical tone of the part 1 is assigned to a channel other than the number of channels PACN (=1). The priority reserving data RSV corresponding to the channel 2 is 0, and thus, when a "key on" operation of a new musical tone of the part 0 is effected, data PRT having the value 0, data OLD in which the end is 3, and data RSV for which the value is the maximum 3, are written to a channel corresponding to the channel 2. Further, the modification of data OLD and RSV is effected by decrementing each of the values respectively indicated by the data OLD and RSV by 1.

Thus, the channel 2, which is a channel other than the number of channels PACN assigned to the part 1 and has been assigned to the part 1, is reassigned to the new musical tone of the part 0. Thus, a channel to be assigned to a new musical tone is selected only from more than one channel which is not a channel of the number of channels PACN assigned to each part, and is diverted. Consequently, the number of channels PACN assigned to each part can be always ensured.

(3) A practical example of the process performed in steps 07 and 08 of FIG. 1 (corresponding to steps 1 1 to 19 of FIG. 5 and steps 21 to 33 of FIG. 6) is illustrated in FIG. 8(3).

Where musical tone data of the part 0 is assigned to the channels 0, 1 and 3 and musical tone data of the part 1 is assigned to the channel 2, and moreover, data OLD corresponding to the earliest "key on" event occurring at the channel 0 is 0, when a "key on" operation of a musical tone of the part 0 is effected, data PRT which is 0, data OLD in which the end is 3, and data RSV which is 3 (i.e., the maximum thereof) are written to the channel 0. Further, the modification of the data OLD and RSV is performed by subtracting 1 from each of the pieces of data OLD and RSV corresponding to the other channels.

Thus, where no "key off" channel exists, and moreover, no channel exists other than the number of channels PACN, when a "key on" operation of a musical tone of a part a channel is effected, a channel assigned to the part corresponding to a musical tone for which the "key on" operation is effected earlier than those of musical tones corresponding to other channels assigned to the part. Therefore, the number of channels PACN assigned to a part cannot be diverted to the production of a sound of a musical tone of another part, as long as the "key on" operations of the corresponding musical tones of such channels are being effected.

Further, where musical tone data of the part 0 is assigned to the channels 0, 1 and 3 and musical tone data of the part 1 is assigned to the channel 2, when a "key on" operation of another musical tone of the part 1 is performed, data PRT of 1, data OLD in which the end is 3, and data RSV of 1 (i.e., the maximum thereof) are written to the channel 2. Further, the modification of the data OLD is performed by subtracting 1 from each of pieces of data OLD corresponding to the other channels. In this case, the number of channels PACN corresponding to the part 1 is 1, and thus the modification of the data RSV is not effected.

Thus, in case of the part 1, when a"key on" operation of a musical tone of a part is newly effected, a channel assigned to the part is diverted to the production of a sound of the musical tone of the part, as in case of the part 0.

(4) A practical example of the process performed in step 10 of FIG. 1 (corresponding to steps 41 to 49 of FIG. 7) is illustrated in FIG. 8(4).

Where musical tone data of the part 0 is assigned to all of the channels, when a "key off" operation of a musical tone assigned to the channel 2 is effected (i.e., the channel 2 becomes a "key off" channel), on/off data corresponding to the channel 2 is cleared. Then the modification of the data RSV is effected by adding 1 to the value indicated by each piece of data RSV corresponding to the channels 0 and 1 which are assigned to the part 0, similar to the "key off" channel 2, and correspond to the data RSV having values other than 0. In this case, values indicated by the corresponding data OLD are not changed.

Although a preferred embodiment of the present invention has been described above, it is to be understood that the present invention is not limited thereto and that other modifications will be apparent to those skilled in the art without departing from the spirit of the invention. For example, musical-tone parts of a piece of music are differentiated from one another by the timbre thereof. Further, the timbres may be distinguished from one another in any of, for example, the following respects: kind of musical instrument such as a piano, a violin and a drum; kind of waveform of musical tones such as a sinusoidal waveform, a triangular waveform and a rectangular waveform; the magnitude of containing-ratios of specific components such as a high-order harmonic wave component and a noise component; and differences among frequency-components corresponding to spectrum groups of specific frequency-bands which correspond to specific formats. In this embodiment, the musical-tone parts are determined according to timbre data values. In addition to the musical-tone parts distinguished from one another by the timbre there of, other kinds of musical-tone parts distinguished from one another by pitch, range (or compass), velocity, performance part (e.g., a rhythm, bass, backing, arpeggio, chord and melody parts) or musical-instrument part (e.g., a hat, drum and cymbal sub-parts of the rhythm part) may be employed. In this case, the musical-tone parts are determined by high-order bits of key chord data, by high-order bits of velocity data, or by data making a distinction among the parts. Such data is written to the musical-tone part memory of FIG. 4.

Moreover, regarding the means of inputting musical tones of each musical-tone part, any appropriate input means may be employed instead of the lower part 1*a* and the upper part 1*b* of the keyboard 1. Further, input means respectively corresponding to parts may be brought together in the keyboard 1. For example, a group of even keys of the keyboard 1 and another group of odd keys thereof may be employed as a first input means for inputting musical tones of a part and a second input means for inputting musical tones of another part, respectively. Moreover, such first and second input means may be constructed as two separate units used respectively for directing the production of sounds corresponding to musical tones of first and second parts. In this case, the musical-tone parts are determined by, for example, the value of the end of a key chord, or data indicating an input path. Such data is written to the musical-tone part memory of FIG. 4.

Furthermore, in steps 04, 06 and 08, a musical tone for which a "key on" operation is newly effected is assigned to a channel in which the corresponding data OLD has a value smaller than values indicated by data OLD corresponding to other channels (i.e., a channel corresponding to a musical tone for which the "key on" operation is effected earlier than those of other musical tones). Nevertheless, the musical tone may be assigned to a channel corresponding to a musical tone for which the "key on" operation is effected later than those of other musical tones, a musical tone in which the pitch is lower of higher than those of other musical tones, a musical tone in which the envelope level is attenuated to a level lower than those of other musical tones, or a musical tone in which the envelope phase value is large. Namely, any appropriate priority for assignment of a channel to a musical tone may be employed. Note, the co-pending U.S. patent application Ser. No. 07/483,383 discloses a method of searching for a musical tone in which the envelope level is attenuated to the lowest level. Namely, first envelope characteristic data is stored in the assignment memory 8, and thereafter, the envelope characteristic data is decremented with time. Finally, a search is made for a channel corresponding to the envelope characteristic data having the smallest value. Further, when assigning a musical tone to the channel corresponding to the musical tone having the highest pitch, a key chord of 00 . . . 0 is written to the register OLDmin in step 12 of FIG. 5 , and thereafter, it is determined in step 14 whether or not the value indicated by the register OLDmin is smaller than that of the key chord corresponding to the searched for channel.

Further, in step 05, a search may be made for only channels corresponding to a selected specific musical-tone part. In this case, it should be determined prior to step 13 whether or not data PRT stored in the searched channel area matches data PRT representing the selected musical-tone part. The data PRT representing the selected musical-tone part may be data PRT representing a part including a musical tone for which the "key on" operation has been effected.

Further, the number of channels may be more or less than 4, and as long as the total of the number of channels PACN respectively corresponding to all parts is equal to or less than the total number of channels, the number PACN may be other than 1 and 3. Furthermore, more than two musical-tone parts may be used in the electronic musical instrument according to the present invention, and in this case, the number of storage areas (hereunder referred to as musical-tone part areas) of the musical-tone part memory of FIG. 4 should be increased, and the number of channels PACN stored in each musical-tone part area should be changed. Correspondingly to this, the values of the numbers of channels PACN set in step 24 of FIG. 6 should be changed.

The scope of the present invention, therefore, is to be determined solely by the appended claims.

What is claimed is:

1. A channel assigning system for use in an electronic musical instrument, comprising:

directing means for directing a plurality of musical tones, each belonging to a musical tone part, to be sounded;

a plurality of musical-tone generating channels in a number less than a number of said directing means and equal to a maximum number of actually sounded musical tones to be sounded simultaneously;

initial channel assignment means for assigning a predetermined number of said plurality of musical-tone generating channels to each musical tone part wherein said plurality of musical tones having a particular musical tone part are assigned to the predetermined number of said plurality of musical-tone channels assigned to the particular tone part, prior to said plurality of musical tones having a different tone part;

discerning means for discerning whether at least one idle channel exists among the predetermined number of said plurality of musical-tone generating channels for each musical tone part;

channel assigning means for assigning each of the plurality of musical tones directed by said directing means to one of said plurality of musical-tone generating channels, said channel assigning means including, first assignment control means for assigning a first of said plurality of musical tones directed by said directing means to an idle channel of said predetermined number of said plurality of musical-tone generating channels corresponding to a musical tone part of said first musical tone when said discerning means indicates that at least one idle channel of said predetermined number of said plurality of musical-tone generating channels corresponding to the musical tone part of said first musical tone exists, and second assignment control means for diverting the first musical tone directed by said directing means to an idle channel of said predetermined number of said plurality of musical-tone generating channels corresponding to another musical tone part, when said discerning means indicates that at least one idle channel of said predetermined number of said plurality of musical-tone generating channels corresponding to the musical tone part of said first musical tone does not exist and when said discerning means indicates that at least one idle channel of said predetermined number of said plurality of musical-tone generating channels corresponding to another musical tone part does exist;

whereby said channel-assigning means diverts said predetermined number of said plurality of musical-tone generating channels corresponding to the other musical tone parts to the musical tone part of said first musical tone and from said predetermined number of said plurality of musical-tone generating channels corresponding to the musical tone part of said first musical tone to the other musical tone parts.

2. The channel assigning system of claim 1, wherein each musical tone part represents timbres of said plurality of musical tones.

3. The channel assigning system of claim 1, wherein the musical-tone parts represent ranges of musical tones.

4. The channel assigning system of claim 1, wherein each musical tone part represents velocities of said plurality of musical tones.

5. The channel assigning system of claim 1, wherein each musical tone part represents performance parts of said plurality of musical tones.

6. The channel assigning system of claim 1, wherein the idle channel includes at least one musical-tone generating channel not currently assigned a musical tone.

7. The channel assigning system of in claim 1, wherein the idle channel of said predetermined number of said plurality of musical-tone generating channels corresponding to another musical tone part is selected from said musical-tone generating channels assigned to any other musical tone part.

8. The channel assigning system of claim 1, wherein the idle channel of said predetermined number of said plurality of musical-tone generating channels corresponding to another musical tone part is selected from said musical-tone generating channels assigned to specific other musical-tone parts.

9. The channel assigning system of claim 1, wherein the musical-tone generating channel assigned by said second assignment control means is a channel assigned a musical tone for which the sounding operation is started earlier than the sounding operations of musical tones of any other channel.

10. The channel assigning system of claim 1, wherein the musical-tone generating channel assigned by said channel assigning means is a channel assigned a musical tone in which an envelope level is lower than envelope levels of musical tones of any other channels.

11. The channel assigning system of claim 1, wherein said first assignment control means includes part data storing means for storing part data representing the musical-tone parts of the musical tone which is assigned to one of the musical-tone generating channels by said first assignment control means.

12. The channel assigning system of claim 1, wherein said second assignment control means, includes priority reserving data storing means for storing priority reserving data representing the idle channel.

13. A channel assigning system for use in an electronic musical instrument, comprising:

directing means for directing a musical tone, belonging to a musical tone part, to be sounded;

a plurality of musical-tone generating channels in a number less than a number of said directing means and equal to a maximum number of actually sounded musical tones to be sounded simultaneously;

initial channel assignment means for assigning a predetermined number of said plurality of musical-tone generating channels to each musical tone part wherein musical tones having a particular musical tone part are assigned to the predetermined number of said plurality of musical-tone channels assigned to the particular tone part, prior to said musical tones having a different tone part;

channel-assigning means for assigning said musical tone to an idle channel of said predetermined number of said plurality of musical-tone generating channels corresponding to a musical tone part of said musical tone when at least one idle channel of said predetermined number of said plurality of musical-tone generating channels corresponding to the musical tone part of said musical tone exists and for diverting said musical tone to an idle channel of said predetermined number of said plurality of musical-tone generating channels corresponding to another musical tone part, when at least one idle channel of said predetermined number of said plurality of musical-tone generating channels corresponding to the musical tone part of said musical tone does not exist and when at least one idle channel of said predetermined number of said plurality of musical-tone generating channels corresponding to another musical tone part does exist;

part data storing means for storing part data representing the musical-tone part of said musical tone;

priority reserving data storing means for storing priority reserving data representing a diverted channel, based on the part data of said part data storing means, wherein said diverted channel is at least one of said plurality of musical-tone generating channels to which are assigned to the musical tones of any of the plurality of musical-tone parts, and are other than said predetermined number of channels; and assignment control means for assigning a new musical tone to the diverted channel, based on the priority data of said priority reserving data storing means;

whereby said channel-assigning means diverts the at least one idle channel of said predetermined number of said plurality of musical-tone generating channels corresponding to the other musical tone parts to the musical tone part of said musical tone and the at least one idle channel of said predetermined number of said plurality of musical-tone generating channels corresponding to the musical tone part of said musical tone to the other musical tone parts.

14. The channel assigning system of claim 13, wherein the musical-tone part represents one of timbres, ranges, velocities and performance parts of musical tones.

15. The channel system of claim 13, wherein the idle channel assigned by said channel assigning means is a diverted channel assigned a musical tone for which a sounding operation is begun before a sounding operation of musical tones of any other channels.

16. The channel assigning system of claim 13, wherein the idle channel assigned by said channel assigning means is a diverted channel assigned a musical tone in which an envelope level is lower than envelope levels of musical tones of any other channels.

17. A method of assigning channels in an electronic musical instrument, comprising the steps of:

(a) directing a musical tone, belonging to a musical tone part, to be sounded;

(b) assigning a predetermined number of a plurality of musical-tone generating channels to each musical tone part wherein musical tones having a particular musical tone part are assigned to the predetermined number of said plurality of musical-tone channels assigned to the particular tone part, prior to other musical tones having a different tone part;

(c) discerning whether at least one idle channel exists among the predetermined number of said plurality of musical-tone generating channels for each musical tone part;

(d) assigning the musical tone to one of said plurality of musical-tone generating channels in said step (c), said step (d) including the substeps of (d) (1) assigning the musical tone to an idle channel of said predetermined number of said musical-tone generating channels corresponding to a musical tone part of the musical tone when at least one idle channel of said predetermined number of said plurality of musical-tone generating channels corresponding to musical tone part of the musical tone exists; and (d)(2) assigning the musical tone to an idle channel of said predetermined number of said plurality of musical-tone generating channels corresponding to another musical tone part, when said at least one idle channel of said predetermined number of said plurality of musical-tone generating channels corresponding to the musical tone part of the musical tone does not exist, and when at least one idle channel of said predetermined number of said plurality of musical-tone generating channels corresponding to another musical tone part does exist;

wherein said at least one idle channel of said predetermined number of said musical-tone generating channels corresponding to the other musical tone parts are diverted to the musical tone part of the musical tone and said at least one idle channel of said predetermined number of said plurality of musical-tone generating, channels corresponding to the musical tone part of the musical tone is diverted to the other musical tone parts.

18. The method of claim 17, wherein each musical-tone part represents one of timbres, ranges, velocities, and performance parts of musical tones.

19. The method of claim 17, wherein said step (d)(2) assigns the musical tone to an idle channel assigned a musical tone for which a sounding operation is begun before sounding operations of musical tones of any other channels.

20. The method of claim 17, wherein step (d) (2) assigns the musical tone to an idle channel assigned a musical tone with an envelope level lower than envelope levels of musical tones of any other channels.

21. The method of claim 17, wherein said step (d), further includes storing part data representing each musical-tone part.

22. The method of claim 17, wherein step (d)(2) further includes storing priority reserving data representing the idle channel.

* * * * *